United States Patent [19]

Moriya et al.

[11] 4,222,464
[45] Sep. 16, 1980

[54] DISC BRAKE APPARATUS FOR A MOTOR VEHICLE

[75] Inventors: Michio Moriya; Yukinori Nishiyama, both of Itami, Japan

[73] Assignee: Sumitomo Electric Industries, Ltd., Osaka, Japan

[21] Appl. No.: 970,308

[22] Filed: Dec. 18, 1978

[30] Foreign Application Priority Data

Dec. 17, 1977 [JP] Japan ............................ 52-169848[U]

[51] Int. Cl.² ............................................ F16D 55/224
[52] U.S. Cl. ....................................... 188/73.3; 188/26
[58] Field of Search ..................... 188/71.1, 72.4, 73.3, 188/344, 26

[56] References Cited

U.S. PATENT DOCUMENTS

| 4,022,297 | 5/1977 | Haraikawa | 188/344 |
| 4,027,750 | 6/1977 | Kawamoto et al. | 188/73.3 |

FOREIGN PATENT DOCUMENTS

2548927 5/1976 Fed. Rep. of Germany .......... 188/73.3

Primary Examiner—Duane A. Reger

Attorney, Agent, or Firm—Pollock, Vande Sande & Priddy

[57] ABSTRACT

A disc brake apparatus for a motor vehicles comprises a brake caliper having a pair of caliper arms each supporting a brake pad assembly which is disposed at each lateral side of a brake disc. One of the caliper arms contains a hydraulic piston and cylinder operable to press directly the associated brake pad assembly against one side of the brake disc and press indirectly the other brake pad assembly against the other side of the brake disc through corresponding movement of the brake caliper upon application of brake. A mounting block is formed on a stationary portion of the vehicle and has a through-hole extending substantially perpendicular to the brake disc, and a pin secured to the brake caliper extends through the through-hole. The pin serves to mount the brake apparatus to the vehicle stationary portion and to guide the movement of the brake caliper relative to the brake disc. The mounting block has a flat surface engageable with a corresponding flat surface formed on the caliper to thereby transmit to the vehicle stationary portion a torque produced upon application of brake during the forward running of the vehicle.

5 Claims, 4 Drawing Figures

DISC BRAKE APPARATUS FOR A MOTOR VEHICLE

BACKGROUND OF THE INVENTION

The present invention relates to a floating type disc brake apparatus for a motor vehicle and particularly for a two-wheel motor vehicle.

There has been known a floating type disc brake apparatus which comprises a brake housing or caliper disposed to straddle over a brake disc mounted on an axle of the vehicle for rotation with a wheel. The brake caliper has a pair of caliper arms which extend to embrace therebetween a peripheral portion of the brake disc. A pair of brake pad assemblies are disposed at both sides of the brake disc and supported by the respective caliper arms. One of the caliper arms contains a hydraulic piston and cylinder by means of which the associated brake pad assembly is first caused to bear against the brake disc at one side thereof, while the other brake pad assembly is subsequently caused to bear against the other side of the brake disc through the movement of the caliper relative to the brake disc under the reacting force exerted by the brake disc to the brake pad assembly which is first brought into contact with the brake disc. Such conventional disc brake apparatus has a disadvantage that a relatively complicated mounting structure is required for mounting the brake apparatus to a stationary portion of the vehicle body, involving an increased number of mounting parts and time consuming procedures for mounting and dismounting the brake apparatus for repair or replacement of the brake pads. Particularly, the structure for receiving a torque produced upon application of brake becomes complicated.

SUMMARY OF THE INVENTION

It is therefore an object of the invention to provide a disc brake apparatus of the kind described above which can be mounted on the vehicle body in a much facilitated manner with a minimum number of mounting members or parts.

It is another object of the invention to provide a disc brake apparatus which assures with a simple structure a satisfactory torque transmission from the brake disc to the vehicle body upon application of brake.

In view of above and other objects which will become more apparent as description proceeds, there is provided according to a general aspect of the invention a disc brake apparatus for a motor vehicle which comprises a brake disc, a brake caliper disposed to straddle over the brake disc and having a pair of caliper arms which extend to embrace therebetween a peripheral portion of the brake disc, a pair of brake pad assemblies each mounted on each of the caliper arms and disposed in opposition to each other with the brake disc interposed therebetween, hydraulic actuating means disposed in one of the caliper arms and adapted to press directly one of the brake pad assemblies against the brake disc and press indirectly the other brake pad assembly against the brake disc through corresponding movement of the caliper upon application of the brake, a mounting block formed on a stationary portion of said motor vehicle and formed therein with a through-hole extending substantially perpendicular to the brake disc, and a pin secured to the brake caliper and extending slidably through the through-hole, the pin serving to mount the brake caliper on the stationary portion through the mounting block and at the same time to guide the movement of the caliper relative to the brake disc.

Preferably, the mounting block projects in a direction opposite to the rotating direction of the brake disc which corresponds to the forward running direction of the vehicle and has a flat end surface engageable with a complementary flat surface formed on the brake caliper upon application of brake during the forward running of the vehicle. With this structure, a torque produced upon application of brake during the forward running of the vehicle is transmitted to the stationary portion of the vehicle through the engagement between the flat surfaces mentioned above.

The above and other objects, novel features and advantages of the invention will become more apparent from the description of preferred embodiments shown, only by way of example, in the accompanying drawings.

DETAILED DESCRIPTION OF THE PREFERRED EMBODIMENTS

Figure 1:
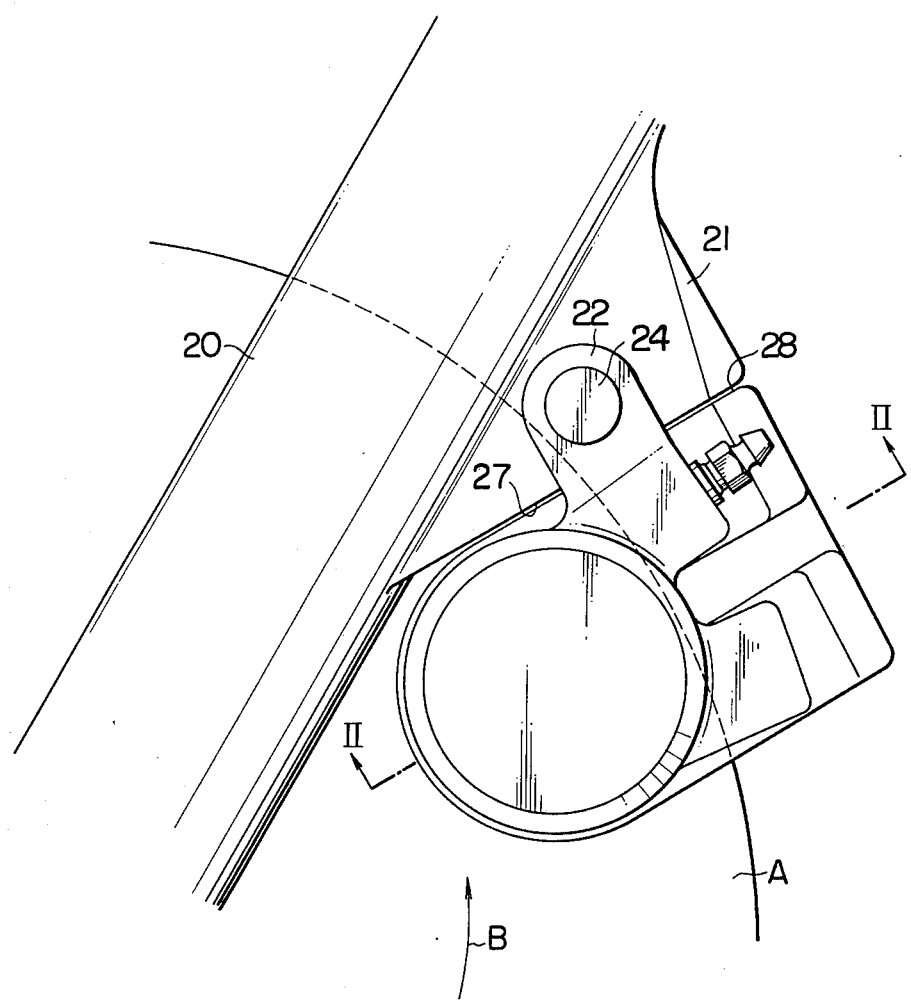
FIG. 1 is a side elevational view showing a floating type disc brake apparatus according to an embodiment of the invention in a state mounted on a stationary part of a two-wheel motor vehicle.
Figure 2:
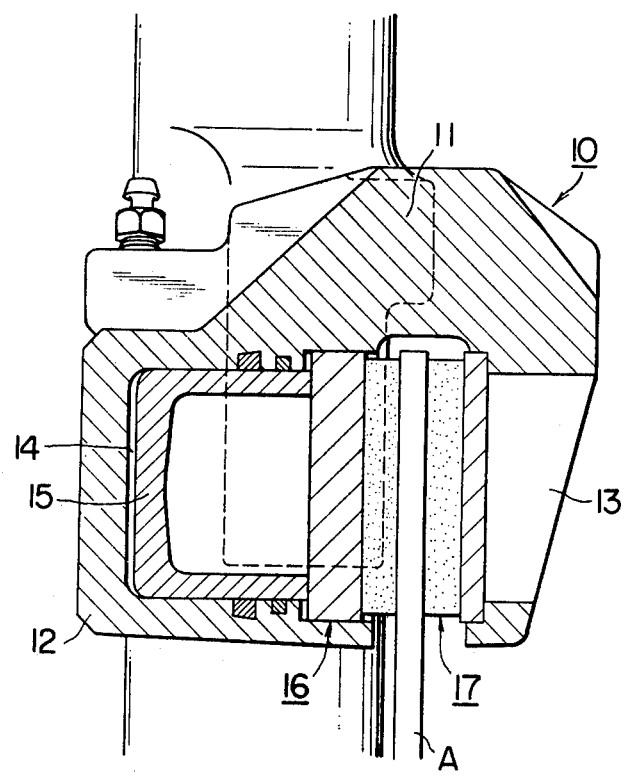
FIG. 2 is a sectional view of the same taken along the line II—II in FIG. 1.
Figure 3:
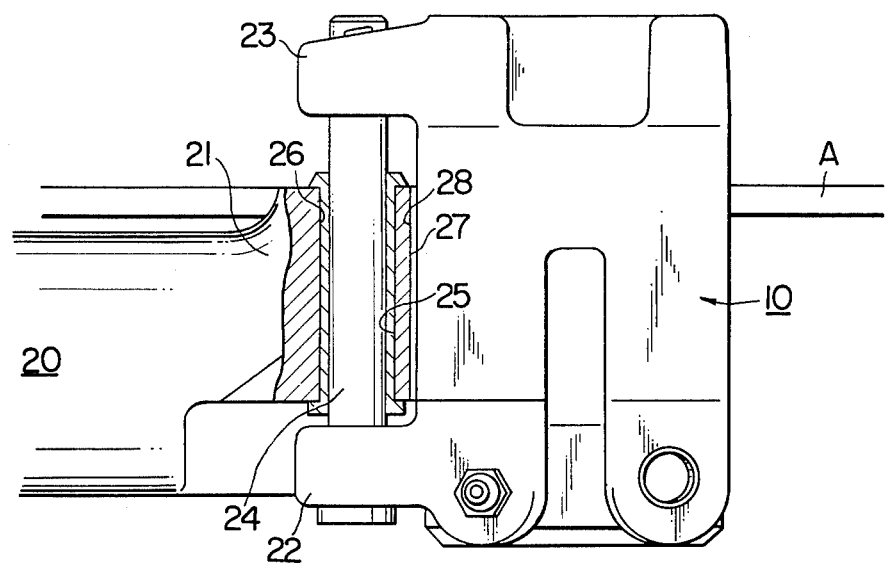
FIG. 3 is a top plan view of the brake apparatus shown in FIG. 1, with a portion being shown in section.

Referring to FIGS. 1 to 3 which show an exemplary embodiment of the disc brake apparatus according to the invention, reference numeral 10 denotes generally a brake housing or caliper having a straddle portion 11 disposed over and across a brake disc A which is mounted on an axle of a motor vehicle such as a two-wheel motor vehicle so as to be rotatable with a wheel. The caliper 10 has a pair of caliper arms 12 and 13 formed integrally with the straddle portion 11 and depending therefrom to be positioned in opposition to each other with the brake disc A being interposed therebetween, as can be best seen from FIG. 2. A pair of brake pad assemblies 16 and 17 each composed of a backing plate and a brake shoe or pad are supported by the caliper arms 12 and 13, respectively, so that the brake pad assemblies 16 and 17 may be slidably moved toward and away from the lateral sides of the brake disc A in a sandwich manner. One of the caliper arms, the arm 12 in the illustrated embodiment, is formed with a hydraulic cylinder chamber 14 which is communicated to a hydraulic brake actuator operatable by a foot pedal or the like (not shown) and accommodates therein slidably a piston 15 in a fluid-tight manner. The outer end of the piston 15 bears against the backing plate of the brake pad assembly 16 and presses the latter to the brake disc A under the hydraulic pressure in the cylinder 14 when the brake is applied. The other brake pad assembly 17 is supported by the other caliper arm 13.

When brake is to be applied, the brake pad assembly 16 is first brought into frictional contact with one lateral side of the brake disc A under the operation of the hydraulic cylinder and piston apparatus (14 and 15.). Further increase in the hydraulic pressure in the piston chamber 14 will cause the caliper 10 to be moved to the left as viewed in FIG. 2 relative to the brake disc A due to the reacting force exerted therefrom. Thus, the brake pad assembly 17 supported by the other caliper arm 13 is subsequently caused to bear against the brake disc A at the opposite lateral side thereof, whereby the brake disc A as well as the associated wheel are braked to stop rotation.

With the invention, it is intended that the movement of the caliper 10 relative to the brake disc A is guided by a pin or shaft which serves simultaneously to mount the brake apparatus including the brake pad assemblies 16 and 17, cylinder 14 and the piston 15 on a stationary portion of the motor vehicle such as a forked leg member of a two-wheel motor vehicle in a satisfactory manner from the viewpoint of transmitting torque to the body of vehicle upon braking.

According to the teaching of the invention, a fork member 20 of a two-wheel motor vehicle is formed integrally with a mounting block 21 which projects backwardly as viewed in the forward running direction of the motor vehicle, i.e. in the direction opposite to the forward rotating direction of the brake disc A as indicated by an arrow B assuming that the motor vehicle is running forwardly. On the other hand, a pair of projections 22 and 23 are formed on the caliper 10 at lateral sides thereof, as can be best seen from FIG. 3. A mounting and guide pin 24 is secured to the caliper 10 at the projections 22 and 23 and extends slidably through a through-hole 25 formed in the mounting block 21. Reference numeral 26 denotes a sleeve formed of a wear-resistive elastic material for compensating manufacturing tolerance and assuring a smooth guiding function of the mounting pin 24. In this connection, it is to be noted that the space between the projections 22 and 23 is selected greater than the width of the mounting block 21 so that the movement of the caliper relative to the brake disc A described hereinbefore can be allowed. Further, it is preferred in view of the torque transmission that the through-hole 25 is formed such that the center axis thereof lies on a line substantially parallel to the center axis of the brake disc A. In other words, the through-hole 25 extends substantially perpendicular to the brake disc A.

The mounting block 21 has a flat abutting surface 27 at the projecting end thereof, while the caliper 10 has a complementary flat abutting surface 28 between the mounting projections 22 and 23 so that these confronting surfaces 27 and 28 are brought into contact with each other over a relatively large area when the brake apparatus is mounted on the mounting block 21.

As will be apparent from the above description, the single pin 24 serves to mount the brake apparatus onto the stationary portion of the motor vehicle, e.g. a fork member of a two-wheel motor vehicle and at the same time to guide the relative movement of the caliper 10 to the brake disc upon braking operation. In this manner, the mounting structure of the brake apparatus is much simplified according to the teaching of the present invention, whereby the mounting as well as dismounting of the brake apparatus for repair or exchange of the worn brake pads or for other reasons can be easily accomplished merely by removing the pin 24. Besides, transmission of torque to the stationary portion of the vehicle upon braking operation can be attained in a satisfactory manner. For example, when the brake disc A is rotating in the direction B with the vehicle running in the forward direction, torque applied to the brake apparatus from the brake disc A upon braking is directly transmitted to the stationary portion or fork member of the vehicle body through the abutting engagement or contact between the confronting surfaces 27 and 28 of the mounting block 21 and the brake caliper 10 over a relatively large contact area. On the other hand, when the brake disc is rotating in the opposite direction with the motor vehicle running in the backward direction, the transmission of torque from the brake caliper 10 to the vehicle body is effected by way of the mounting pin 24. In the latter case, since the magnitude of torque to be transmitted to the body of vehicle is relatively small as compared with the one to be absorbed upon braking when the vehicle is running in the forward direction, the single mounting and guide pin 24 will be sufficient for transmitting torque to the vehicle body upon braking when the vehicle is running in the backward direction.

Figure 4:
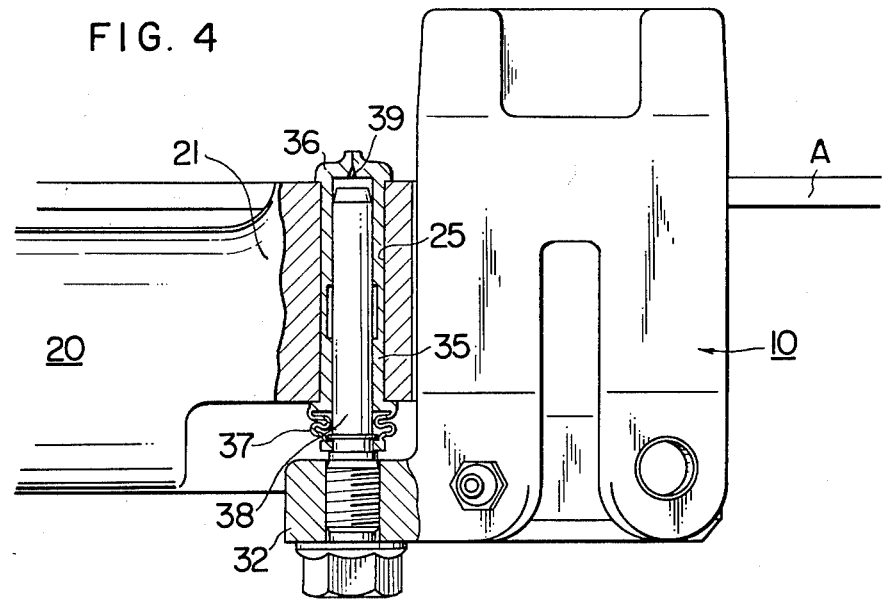
FIG. 4 is a view similar to FIG. 3 but shows modified structure of the invention.

FIG. 4 shows a modification of the mounting structure shown in FIG. 3 which differs from the latter in that only one projection 32 corresponding to the projection 22 shown in FIG. 3 is provided for securing a mounting guide pin 38. The pin 38 is constituted by a bolt-like member having a threaded end portion fixed in the projection 32 through screw engagement therebetween, and extends through the through-hole 25 formed in the mounting block 21 with a sleeve 35 of a wear-resistive elastic material interposed between the through-hole 25 and the pin 38. The sleeve 35 serves to compensate manufacturing tolerance thereby to assure a smooth sliding movement of the pin 38. It will be noted that the sleeve 35 is formed integrally with a cap 36 and a collapsible skirt or boot 37 which serve to protect the mounting guide pin 38 from deposition of foreign particles such as dusts. The cap 36 closes an end of the sleeve 35 opposite to the projection 32 and is formed therein with an inwardly diverging vent hole 39.

In the foregoing, the invention has been described in conjunction with the preferred embodiments illustrated in the drawings. However, it will be appreciated that the invention is never restricted to them but many variations and modifications will readily occur to those skilled in the art without departing from the scope and spirit of the invention.

What is claimed is:

1. A disc brake apparatus for a motor vehicle comprisng:

a brake disc, a brake caliper disposed to straddle over said brake disc and having a pair of caliper arms which extend to embrace therebetween a peripheral portion of said brake disc said caliper having a first end surface facing in the forward running direction of said motor vehicle, a pair of brake pad assemblies each mounted on each of said caliper arms and disposed in opposition to each other with said brake disc interposed therebetween, hydraulic actuating means disposed in one of said caliper arms and adapted to press directly one of said brake pad assemblies against said brake disc and press indirectly the other brake pad assembly against said brake disc through corresponding movement of said caliper upon application of brake, a mounting block formed on a stationary portion of said motor vehicle and formed therein with a single through-hole extending substantially perpendicular to said brake disc, said mounting block projecting in a direction opposite to the rotating direction of said brake disc which corresponds to the forward running direction of said motor vehicle, said mounting block having a second end surface confronting said first end surface, whereby torque is transmitted to said mounting block through contact of said surfaces upon application of the brake during forward running of said vehicle, and at least one pin secured to said brake caliper and extending slidably through said through-hole, said pin serving to mount said brake caliper on said stationary portion through said mounting block and at the same time to guide said movement of said caliper relative to said brake disc.

2. A brake apparatus as set forth in claim 1, including a sleeve made for a wear-resistive elastic material and disposed in said through-hole to receive therein said pin thereby to assure a smooth guide for said movement of said brake caliper.

3. A brake apparatus as set forth in claim 1, wherein said brake caliper is formed with a pair of projections extending at both lateral sides of said mounting block, and said pin has both ends secured to said projections.

4. A brake apparatus as set forth in claim 1, wherein said caliper is formed with a single projection extending at one lateral side of said mounting block, said pin is secured to said projection at one end thereof, and a sleeve made of a wear-resistive elastic material is disposed in said through-hole to receive therein said pin, said sleeve being closed at an end opposite to said one end of said pin and formed with an externally tapered vent hole at said closed end.

5. A brake apparatus as set forth in claim 1, wherein said confronting end surfaces are flat.

* * * * *